Sept. 16, 1930.  H. KRAHN  1,776,034
DUST CART
Filed April 30, 1927
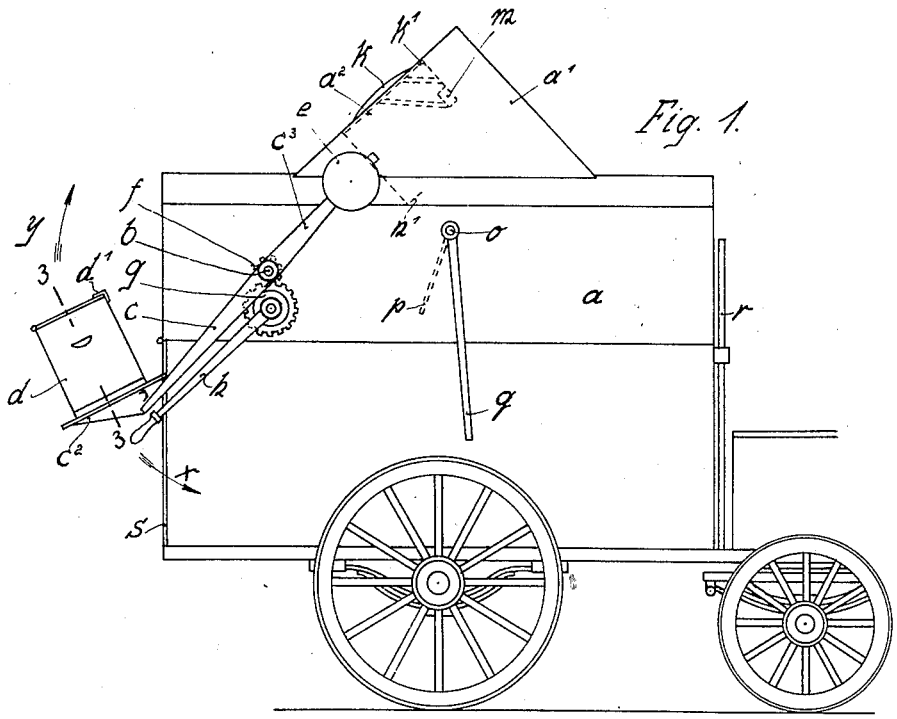
Fig. 1.
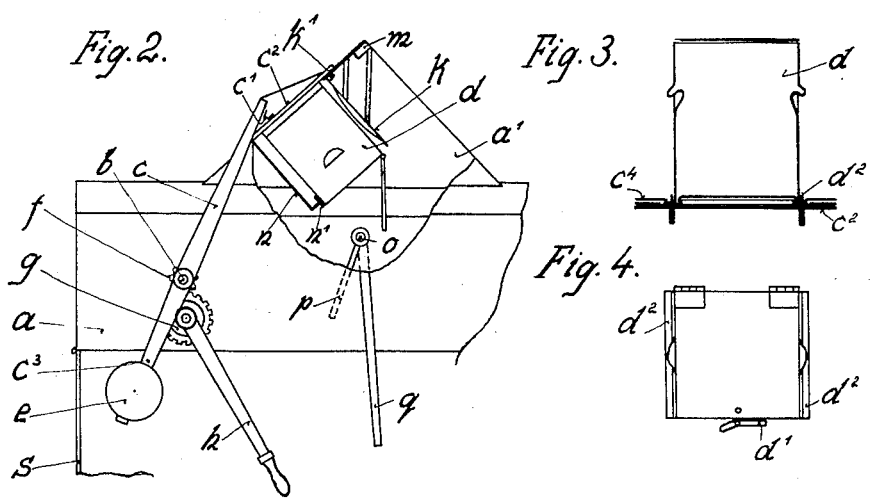
Fig. 2.  Fig. 3.
Fig. 4.
Inventor
Heinrich Krahn
by
S. Sokal, attorney Patented Sept. 16, 1930

1,776,034

UNITED STATES PATENT OFFICE

HEINRICH KRAHN, OF GLADBECK, GERMANY

DUST CART

Application filed April 30, 1927, Serial No. 187,940, and in Germany October 7, 1926.

The present invention relates to road vehicles and more particularly to a dust cart adapted to prevent the escape of dust or refuse during the emptying of the dust bins or containers into it.

In the known dust carts of this kind the emptying of the dust bins is effected through openings provided on the rear end or on the sides of the cart, said openings being furnished with automatic closure devices. In constructions of this kind it is not possible to fill the cart sufficiently to utilize the loading space of the cart completely. Moreover, such carts must not be built very high, as the dust bins cannot be raised by hand beyond a certain height. Besides this, in dust carts of this type it is necessary to provide a large number of openings furnished with automatic closure devices, so as to render it possible to distribute the dust over the whole of the loading space of the cart.

It has also already been proposed to construct the dust cart in the form of a motor vehicle and to convey the dust, which is first tipped in at the lower part of the rear of the cart, upwards into the front part of the cart by means of a screw conveyor which is driven by the motor engine. In this arrangement also, however, the loading space can only be fully utilized by the provision of a separate tipping device for the body of the cart, which renders it possible to tip the refuse towards the back. Carts of this kind are very complicated in construction and very expensive and necessitate the use of a motor drive. Besides this, the tipping of the body of the cart involves waste of time.

The object of the invention is to avoid these drawbacks and to render it possible in a simple manner to utilize the loading space of the cart completely.

The invention consists in a dust cart of the kind set forth at the outset, characterized in that the opening through which the dust bins or containers are emptied is arranged on the roof of the body of the vehicle.

It is preferable to provide the dust cart with a tilting device which is mounted on the body of the cart and by means of which device the dust bin or container can be raised and tilted on to the roof of the cart for emptying purposes. The said tilting device consists preferably of a system of levers.

A preferred constructional form according to the invention is illustrated by way of example in the accompanying drawings, in which:

Fig. 1 is a side view of a dust cart constructed according to the invention,

Fig. 2 is a similar view, partly in section, of the upper part of the body of the cart showing the operative members in another position, Fig. 3 is a section on the line 3—3 of Fig. 1 drawn to a larger scale, and, Fig. 4 is a plan of the dust bin shown in Fig. 3.

Referring to the drawings, $b$ is a shaft journalled in the upper part of the body $a$ of the cart and passing transversely through the said body. On the ends of the shaft $b$ outside of the body $a$ of the cart two levers $c$ are rigidly fixed, the ends of which levers are connected with one another by means of a transverse member $c^1$ so that the levers $c$ form with the transverse member $c^1$ a U-shaped frame rotatable about the axis of the shaft $b$. At its middle portion the transverse member $c^1$ has a backwardly inclined platform $c^2$ built on it, on which platform guide grooves $c^4$ are provided into which the guide members $d^2$ on the base of the dust bin $d$ can be pushed. The levers $c$ may be constructed as double-armed levers and may each be provided on the shorter arm $c^3$ with a counterweight $e$ by means of which a part of the weight of the frame $c$, $c^1$ and the dust bin is counterbalanced.

The shaft $b$ is provided outside the body of the cart with a toothed wheel $f$ which is in engagement with a larger toothed wheel $g$ journalled on the side of the cart body. The toother wheel $g$ is rigidly connected with a long hand lever $h$.

On the roof of the body $a$ of the cart a tilting hood $a^1$ is provided which is located over an opening provided in the said roof. In the rearwardly extending inclined wall of the said hood $a^1$ an opening $a^2$ corresponding approximately to the periphery of the crosssection of the dust bin is provided. Below this opening $a^2$ a closing door $k$ is rotatably mounted at $k^1$. The said door $k$ is provided with a counterweight $m$ which tends to hold it in the position shown in Fig. 1, in which the door $k$ tightly closes up the opening $a^2$. In the hood $a^1$ a partition $n$ is also provided which connects the two side walls of the hood with one another and is furnished with a stop $n^1$ serving to release the locking bolt $d^1$ of the dust bin.

A second shaft $o$ is arranged below the tipping hood and is journalled in the sides of the body $a$ of the cart. On this shaft $o$ a baffle $p$ or like member is rigidly fixed, whilst outside of the body $a$ the said shaft has a hand lever $q$ mounted on it, by actuating which a to-and-fro movement may be communicated to the said baffle $p$. The hand lever $q$ is adapted to be fixed in different angular positions on the side of the body.

The mode of operation of the device described is as follows:—

Normally the door $k$ of the hood $a^1$ is held closed, as shown in Fig. 1, under the action of the counterweight $m$. The levers $c$ and $h$ are also in the positions shown in Fig. 1, in which the transverse member $c^1$ rests on the back of the body of the cart. If now it is desired to empty the dust bin into the cart, the former is first lifted by hand on to the platform $c^2$ and is rigidly fixed on the latter by pushing the angle irons or guide members $d^2$ provided at the bottom of the dust bin into the guide grooves $c^4$ provided on the platform $c^2$. The dust bin is thus brought into the position shown in Fig. 1, the dust bin cover being closed and secured by means of the bolt $d^1$. If now the hand lever $h$ is turned out of the position shown in Fig. 1 in the direction of the arrow $x$, this turning movement is communicated through the medium of the toothed wheels $g$ and $f$ to the frame $c$, $c^1$, which is thus tilted upwards in the direction of the arrow $y$. At the end of this movement the frame $c$, $c^1$ together with the platform $c^2$ and the dust bin $d$ fixed thereon have come into the position shown in Fig. 2, in which the dust bin $d$ by pressing aside the cover $k$ has pushed its way so far into the opening $a^2$ of the hood $a^1$ that the platform $c^2$ rests on the side of the hood $a^1$. Shortly before the dust bin $d$ has reached this position, the locking bolt $d^1$ on its cover will have been opened by striking on the fixed stop $n^1$, so that the cover of the dust bin by virtue of its own weight and that of the load of refuse resting upon it will have opened and the contents of the dust bin will be enabled to empty themselves into the body of the cart. During this operation the contents of the dust bin will be deflected towards the front or the rear part of the body of the cart, just according to the setting of the hand lever $q$ and the baffle $p$ controlled thereby.

In this position of the parts, as shown in Fig. 2, the platform $c^2$ covers up the open edges of the opening $a^2$, and the wall $n$ forms together with the side walls of the tipping hood $a^1$ and the open cover $k$ a kind of shaft surrounding the dust bin $d$, which contributes considerably to the avoidance of dust leakage.

When the body $a$ of the cart is nearly full, the baffle $p$ may be used as a distributing means by moving the hand lever and thus also the said baffle to-and-fro so that the upper part of the heap of dust which has collected under the hood $a^1$ is pushed over towards the ends of the cart.

After the dust bin has been emptied, the hand lever $h$ is again moved into the position shown in Fig. 1, so that the frame $c$, $c^1$ together with the platform $c^2$ and the dust bin $d$ are brought back again into the initial position, as also shown in Fig. 1. The dust bin $d$ may then be removed again by withdrawing it from the guide grooves $c^4$ of the platform.

When the body $a$ of the cart is completely filled, it can be raised by means of a lifting member $r$, in a manner known per se and can be tilted about the rear axle or about the rear end of the vehicle frame. The rear end $s$ of the body of the cart is fixed at its upper end by means of hinges, so that after releasing the locking device of the said end $s$ the body of the cart may be emptied by tipping. Before tipping the body $a$ of the cart the hand lever $h$ is moved into the position shown in Fig. 2, so that the platform $c^2$ rests on the opening $a^2$ of the hood $a^1$.

The upper part of the body $a$ of the cart may, as shown on the drawing, form a separate part containing all the component members of the emptying device and may be removable from the undercarriage, so that the cart may be used with the undercarriage alone as a vehicle for ordinary purposes.

Instead of arranging the levers $c$ at the outside of the body $a$ of the cart, these may be arranged in the middle of said body, in which case they may lie in a recess in the body which is shut off from the interior of the body by suitable constructional means.

The rigid attachment of the dust bin $d$ to the platform $c^2$ may, of course, also be effected by other means than by the insertion of the dust bin in a guide groove provided on the platform.

I claim:

1. A dust cart comprising in combination: a cart body; a shaft transversely journalled in the upper rear part of the side walls of said cart body; a lever rigidly mounted on said shaft so as to rotate therewith, and extending longitudinally beyond the back of said cart body; a tilting platform rigidly attached to said lever at the outside of the back of said cart body; a dust bin; means for attaching said dust bin to said platform operative at the bottom of the dust bin only; a roof on said cart body; a hood on said roof having an inclined flat wall provided with an opening adapted to receive said dust bin; a cover pivotally mounted on the wall of said hood and urged upwards in such manner as to close positively and tightly said opening from the interior, said cover being adapted to be opened by the downward pressure of the penetrating dust bin when the latter is inserted into said opening, and to close automatically on the removal of said dust bin; and a hand lever adapted to actuate said first named lever so as to tilt the said platform together with said dust bin over the rear end of said cart body in such manner that said dust bin automatically opens said cover of said opening and penetrates in the axial direction of said opening entirely within said hood, whereby said platform comes to rest flat up against the inclined wall of said hood and thus completely covers up said opening, substantially as described.

2. A dust cart, as specified in claim 1, in further combination with a partition within said hood connecting the two side walls thereof and arranged immediately below the lower horizontal edge of the opening of said hood parallel to the axial direction of the opening whereby, when said dust bin has penetrated entirely within said hood, it will be enclosed on all sides, namely on its under side by said partition, on its upper side by the opened cover of said hood, and on the remaining two sides by the side walls of the hood, substantially as described.

3. A dust cart, as specified in claim 1, in further combination with: a locking device for positively locking said cover to said dustbin in the closed position, and a device within said cart body for positively releasing said locking device automatically when said dust bin has penetrated entirely within said hood, substantially as described.

In testimony whereof I have signed my name to this specification.

HEINRICH KRAHN.